US012474537B2

(12) United States Patent
Kim et al.

(10) Patent No.: US 12,474,537 B2
(45) Date of Patent: Nov. 18, 2025

(54) HIGH STABILITY OPTOMECHANICAL SYSTEM AND CRYO-PACKAGE ASSEMBLY FOR QUANTUM COMPUTING

(71) Applicant: Duke University, Durham, NC (US)

(72) Inventors: Jungsang Kim, Durham, NC (US); Ismail Inlek, Durham, NC (US); Robert Spivey, Durham, NC (US)

(73) Assignee: Duke University, Durham, NC (US)

(*) Notice: Subject to any disclaimer, the term of this patent is extended or adjusted under 35 U.S.C. 154(b) by 460 days.

(21) Appl. No.: 17/883,062

(22) Filed: Aug. 8, 2022

(65) Prior Publication Data
US 2023/0037882 A1 Feb. 9, 2023

Related U.S. Application Data

(60) Provisional application No. 63/230,403, filed on Aug. 6, 2021.

(51) Int. Cl.
G02B 7/00 (2021.01)
(52) U.S. Cl.
CPC .................... G02B 7/003 (2013.01)
(58) Field of Classification Search
None
See application file for complete search history.

(56) References Cited

U.S. PATENT DOCUMENTS

| 3,691,053 | A * | 9/1972 | James | C23C 14/564 |
| | | | | 204/192.12 |
| 2003/0006350 | A1* | 1/2003 | Hacker | G01M 11/04 |
| | | | | 248/176.1 |
| 2004/0074176 | A1* | 4/2004 | Baker | A47B 87/0207 |
| | | | | 52/263 |

(Continued)

FOREIGN PATENT DOCUMENTS

| CN | 101656187 A | * 2/2010 | |
| EP | 3076216 A1 | * 10/2016 | ........... G02B 6/3616 |

(Continued)

OTHER PUBLICATIONS

English machine translation for JP-2006229563-A (Year: 2006).*
English machine translation for RO-120673-B1 (Year: 2006).*
Antohi et al., "Cryogenic ion trapping systems with surface-electrode traps", Rev. Sci. Instrum. Jan. 1, 2009; 80 (1): 013103. (Year: 2009).*
English machine translation for CN-101656187-A (Year: 2010).*

(Continued)

Primary Examiner — Robert H Kim
Assistant Examiner — Alina Kaliszewski
(74) Attorney, Agent, or Firm — Barnes & Thornburg LLP

(57) ABSTRACT

Technologies for an optomechanical system include an intermediate plate having a top surface with multiple tapped holes arranged in a grid. A pair of dowel pin holes surround each tapped hole in a linear pattern. Multiple optical blocks are coupled to the intermediate plate using dowel pins positioned in the dowel pin holes and corresponding dowel pin holes defined in the bottom surface of the optical block. Each optical block includes multiple optical elements coupled to the top surface of the optical block with dowel pins. A cryostat may be coupled to the intermediate plate. A cryo-package assembly is mounted inside a cryo chamber of the cryostat. The cryo-package assembly includes a cryo device such as an ion trap covered by a machined copper lid. The lid includes a meandering passageway to allow for differential pumping in order to achieve ultra-high vacuum within the cryo-package assembly.

7 Claims, 12 Drawing Sheets

(56) References Cited

U.S. PATENT DOCUMENTS

| | | | | |
|---|---|---|---|---|
| 2004/0256746 | A1* | 12/2004 | Kitabayashi | G02B 27/102 |
| | | | | 348/E9.027 |
| 2006/0274394 | A1* | 12/2006 | Riley | G11B 7/22 |
| 2008/0036103 | A1* | 2/2008 | Ban | G02B 6/4246 |
| | | | | 264/1.25 |
| 2009/0116793 | A1* | 5/2009 | Nishimura | G02B 6/3885 |
| | | | | 385/78 |
| 2017/0234766 | A1* | 8/2017 | Haft | F25B 21/00 |
| | | | | 356/244 |
| 2019/0027355 | A1* | 1/2019 | Kim | H01J 49/16 |

FOREIGN PATENT DOCUMENTS

| | | | | | |
|---|---|---|---|---|---|
| JP | 2006229563 | A | * | 8/2006 | |
| RO | 120673 | B1 | * | 5/2006 | |
| RU | 2614104 | C1 | * | 3/2017 | |
| WO | WO-9610204 | A1 | * | 4/1996 | G01M 11/04 |
| WO | WO-02085532 | A1 | * | 10/2002 | B05B 12/16 |
| WO | WO-2014120939 | A1 | * | 8/2014 | F16M 11/04 |
| WO | WO-2017070379 | A1 | * | 4/2017 | A47B 13/08 |
| WO | WO-2022011290 | A1 | * | 1/2022 | G06N 10/00 |

OTHER PUBLICATIONS

English machine translation for RU-2614104-C1 (Year: 2017).*
Spivey et al., "High-Stability Cryogenic System for Quantum Computing With Compact Packaged Ion Traps," 3 IEEE Trans. Quant. Eng'g 5100111 (2022) (published Nov. 8, 2021).

* cited by examiner

HIGH STABILITY OPTOMECHANICAL SYSTEM AND CRYO-PACKAGE ASSEMBLY FOR QUANTUM COMPUTING

CROSS-REFERENCE TO RELATED APPLICATIONS

This application claims the benefit of and priority to U.S. Patent Application No. 63/230,403, entitled "HIGH STABILITY CRYOGENIC SYSTEM FOR QUANTUM COMPUTING," which was filed on Aug. 6, 2021, which is incorporated herein by reference in its entirety.

STATEMENT REGARDING FEDERALLY SPONSORED RESEARCH

This invention was made with Government support under Federal Grant No. W911NF-16-1-0082, awarded by the Intelligence Advanced Research Projects Activity (IARPA)/ARO and by Federal Grant No. PHY-1818914 awarded by the National Science Foundation. The Government has certain rights in this invention.

BACKGROUND

Highly sensitive optical experiments and other optical systems are typically realized by custom construction from off-the-shelf, commercially available parts such as optical breadboards, posts, clamps, and optical elements. Such components are typically assembled by hand and may be subject to drift with temperature changes and otherwise require frequent adjustment to keep optical alignment optimized. Alternatively, optical systems may be constructed from a custom-machined, monolithic optomechanical construction with optical elements permanently affixed. Such monolithic construction may improve stability but with greatly increased cost and reduced flexibility. In addition, such monolithic optomechanical construction is not suited for prototyping or experimentation.

SUMMARY

According to one aspect of the disclosure, an optical block includes a plate having a top surface and a bottom surface. The bottom surface includes a plurality of tapped holes and a first plurality of dowel pin holes defined therein. Each tapped hole of the plurality of tapped holes is positioned on the bottom surface on an imaginary grid defined by a first distance. Tor each tapped hole a pair of dowel pin holes of the first plurality of dowel pin holes is positioned on the bottom surface, wherein each dowel pin hole of the pair of dowel pin holes is positioned a second distance from the tapped hole. The top surface includes a second plurality of dowel pin holes defined therein. Each dowel pin hole of the second plurality of dowel pin hole is positioned at a predetermined position. In an embodiment, the plate comprises cast aluminum.

In an embodiment, each pair of dowel pin holes of the first plurality of dowel pin holes is positioned in a linear arrangement with the corresponding tapped hole, and wherein the tapped hole is positioned between the pair of dowel pin holes. In an embodiment, the linear arrangement is aligned with a gridline of the imaginary grid. In an embodiment, the linear arrangement is angled 45 degrees relative to a gridline of the imaginary grid.

In an embodiment, each of the first plurality of dowel pin holes and the second plurality of dowel pin holes comprises a 2 millimeter diameter hole. In an embodiment, each of the first plurality of dowel pin holes, and each of the second plurality of dowel pin holes comprises a blind hole extending partially through the plate. In an embodiment, each of the tapped holes comprises a ¼-20 UNC hole or an 8-32 UNC hole. In an embodiment, the first distance comprises 1 inch or 2 inches, and the second distance comprises 5 millimeters.

In an embodiment, the optical block further includes a plurality of optical elements. Each optical element is coupled to the top surface by one or more dowel pins positioned in corresponding dowel pin holes of the second plurality of dowel pin holes. In an embodiment, the plurality of optical elements comprises a laser, a reflector, a refractor, a collimator, a filter, an optical isolator, an acousto-optic modulator, an electro-optic modulator, or a fiber optic cable.

According to another aspect, an optomechanical system includes an intermediate plate and a plurality of optical blocks coupled to the intermediate plate. The intermediate plate has a top surface that comprises a first plurality of tapped holes and a first plurality of dowel pin holes defined therein. The first plurality of tapped holes are arranged on the top surface in a grid pattern having a first distance between tapped holes. For each tapped hole a pair of dowel pin holes of the first plurality of dowel pin holes is positioned on the top surface. Each dowel pin hole of the first plurality of dowel pin holes is positioned a second distance from the tapped hole. Each optical block of the plurality of optical blocks comprises a plate having a top surface and a bottom surface. The bottom surface comprises a second plurality of dowel pin holes defined therein. The top surface comprises a third plurality of dowel pin holes defined therein, wherein each dowel pin hole of the third plurality of dowel pin hole is positioned at a predetermined position. The bottom surface of each optical block is coupled to the top surface of the intermediate plate by a plurality of dowel pins positioned in corresponding dowel pin holes of the first plurality of dowel pin holes and the second plurality of dowel pin holes.

In an embodiment, the intermediate plate comprises cast aluminum. In an embodiment, the bottom surface of each optical block further comprises a second plurality of tapped holes defined therein. Each optical block is further coupled to the intermediate plate by one or more fasteners positioned in corresponding tapped holes of the first plurality of tapped holes and the second plurality of tapped holes.

In an embodiment, the optomechanical system further comprises a base plate comprising a top surface. The intermediate plate comprises a bottom surface, and the bottom surface of the intermediate plate is coupled to the top surface of the base plate. In an embodiment, the optomechanical system further comprises a cryostat coupled to the base plate. In an embodiment, the plurality of optical blocks are optically coupled in free space to a cold chamber of the cryostat. In an embodiment, the plurality of optical blocks are optically coupled by an optical fiber to a second optomechanical system comprises a second plurality of optical blocks.

In an embodiment, the optomechanical system further comprises a plurality of posts coupled between the intermediate plate and a first optical block of the plurality of optical blocks. Each post comprises a bottom end and a top end. The bottom end comprises a fourth plurality of dowel pin holes defined therein, and the top end comprises a fifth plurality of dowel pin holes defined therein. The bottom end of each post is coupled to the top surface of the intermediate plate by a plurality of dowel pins positioned in corresponding dowel pin holes of the first plurality of dowel pin holes and the fourth plurality of dowel pin holes. The top end of each post is coupled to the bottom surface of the first optical block by a plurality of dowel pins positioned in corresponding dowel pin holes of the fifth plurality of dowel pin holes and the second plurality of dowel pin holes.

According to another aspect, a cryo-package assembly comprises a package comprising a substrate configured to support a cryo device and a metallic lid coupled to the package. The lid comprises a top surface, a bottom surface, and a side wall extending between the top surface and the bottom surface. A first opening is defined in the bottom surface, and an inner wall extends inwardly from the first opening and defines an interior cavity. When the lid is coupled to the package. the cryo device is positioned within the interior cavity. The lid defines a meandering passageway from a first end to a second end. The first end is in communication with an exterior of the lid, and the second end is in communication with the interior cavity. The meandering passageway defines a nonlinear path between the first end and the second end. In an embodiment, the lid comprises metallic copper.

In an embodiment, the inner wall further defines a getter cavity in communication with the interior cavity. The getter cavity is configured to receive a charcoal getter device, the charcoal getter device comprising activated charcoal packaged in a copper mesh.

In an embodiment, the cryo-package assembly further includes a ring frame coupled to the package. The ring frame surrounds the cryo device. The bottom surface of the lid defines a ring frame groove, and when the lid is coupled to the package the ring frame groove receives the ring frame. In an embodiment, the cryo device comprises an ion trap device.

In an embodiment, the cryo-package assembly further comprises an imaging window coupled to the lid. A second opening is defined in the top surface of the lid, wherein the second opening is in communication with the interior cavity. The top surface includes a groove extending along a nonlinear path to the second opening. The imaging window is coupled to the lid and covers the second opening. The imaging window and the groove cooperate to define the meandering passageway. In an embodiment, the lid further comprises an annular imaging window surround extending upward from the top surface of the lid, wherein the imaging window surround receives the imaging window. In an embodiment, the imaging window surround includes an inner wall extending upward from the top surface of the lid, wherein the inner wall surrounds the second opening, wherein a second groove is defined in the inner wall, wherein the second groove is in communication with the groove defined in the top surface, and wherein the imaging window and the second groove further define the meandering passageway.

In an embodiment, the lid further comprises a ground shield wall extending inwardly from the second opening to an inner end. The inner end defines an aperture in communication with the interior cavity. The aperture is narrower than the second opening.

In an embodiment, a plurality of tapped holes are defined in the top surface of the lid. In an embodiment, a side window opening is defined through the side wall. The cryo-package assembly further includes a side window coupled to the lid in the side window opening. In an embodiment, the cryo-package assembly further includes an ablation target positioned within the interior cavity. The ablation target has a line of sight to the side window.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
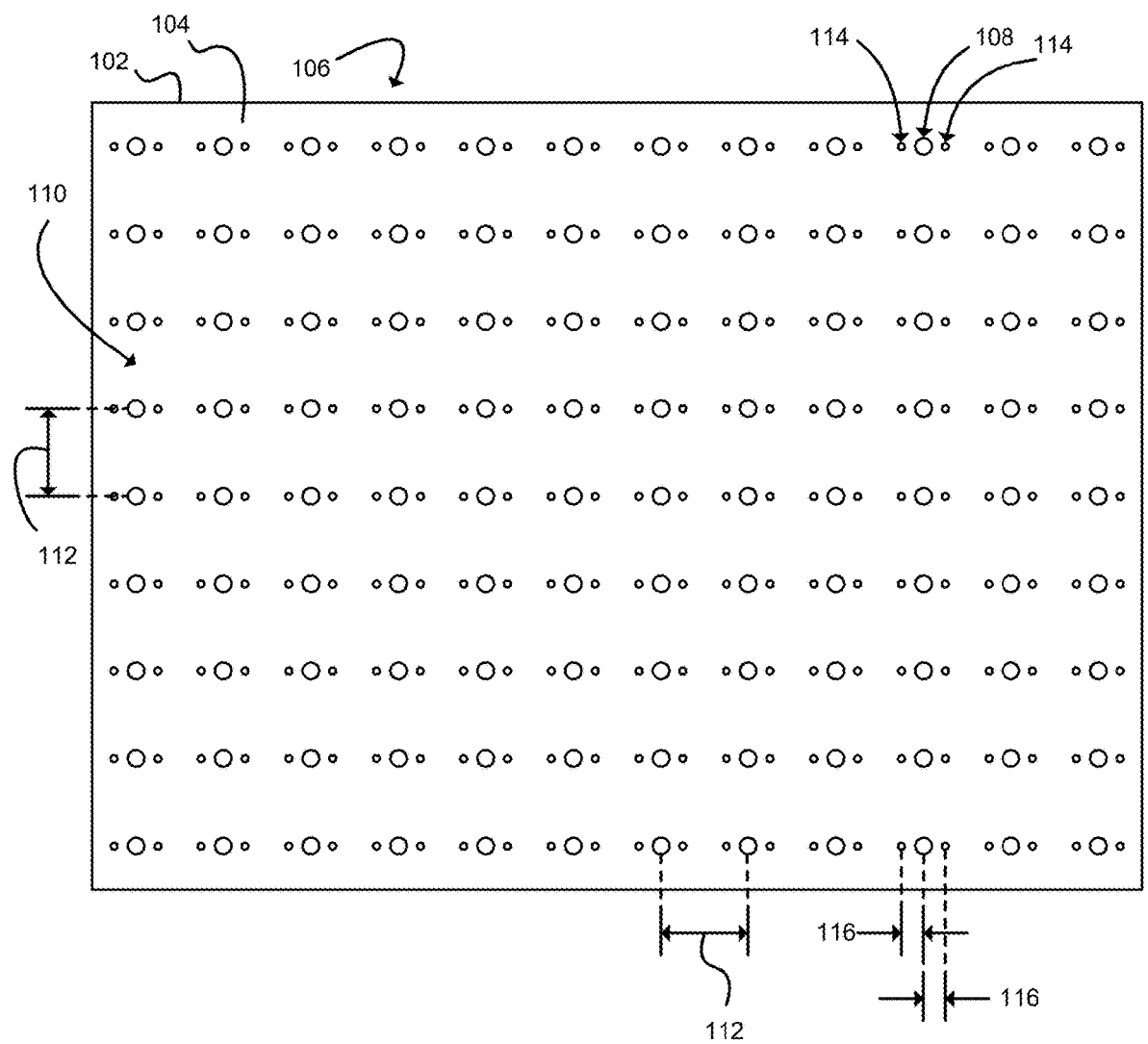
FIG. 1 is a top view of a module plate for an optomechanical system.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B);

(C); (A and B); (B and C); or (A, B, and C). Similarly, items listed in the form of "at least one of A, B, or C" can mean (A); (B); (C); (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIGS. 1-6, an illustrative optomechanical system 100 includes a module plate that may be coupled to one or more optical blocks. Multiple optical elements are coupled to each of the optical blocks. The optical elements may interact in free space, and an entire module (e.g., an assembly of a module plate, optical blocks, and optical elements) may be coupled to other modules, for example by optical fiber. As described further below, the system 100 provides stable construction for sensitive optical experiments and other optical systems, while retaining flexibility (e.g., replacing optical blocks or optical elements for prototyping or experimentation). Compared to traditional optical experiments assembled with posts and clamps, the system 100 has improved stability with reduced need for readjustment. For example, an illustrative embodiment of the system 100 used in a cryogenic ion trap system did not require adjustment of single-mode fiber coupling alignments for over a year of system operation. Additionally, compared to traditional monolithic optomechanical construction, the system 100 has reduced cost and increased flexibility, for example with the ability to replace individual optical blocks.

Referring now to FIG. 1, the system 100 includes a module plate 102, also called an intermediate plate 102, which is illustratively formed from cast aluminum. In particular, the module plate 102 as well as additional optical blocks described below may be machined from MIC-6 (tool and jig) cast aluminum plates. This material provides low stress and good flatness specifications. Additionally, the granular structure of cast aluminum allows for high speed machining while minimizing distortion that could arise from working with rolled aluminum.

The illustrative module plate 102 is generally rectangular and includes a top surface 104 and a bottom surface 106. The bottom surface 106 may be attached to an optical table, a base plate, or other support structure (not shown). Multiple tapped holes 108 are defined in the top surface 104. Each tapped hole 108 may be embodied as a hole that is threaded to receive a predetermined fastener, such as a ¼-UNC 20 tapped hole, an 8-32 UNC tapped hole, or other tapped hole. The tapped holes 108 are arranged on the top surface in a regular grid 110 having a pitch defined by a distance 112. That is, an imaginary grid 110 is formed from gridlines that are separated by the distance 112 in both the horizontal and the vertical directions. Each tapped hole 108 is positioned at an intersection of two of those imaginary gridlines. Accordingly, each tapped hole 108 is separated on-center from its neighboring tapped holes 108 by the distance 112. The distance 112 may be two inches, one inch, or another predetermined distance.

Each of the tapped holes 108 is surrounded by a pair of dowel pin holes 114, which are positioned in a linear arrangement with the tapped hole 108. Each dowel pin hole 114 may be embodied as a smooth-walled hole that is sized to receive a dowel pin as described further below. Illustratively, each dowel pin hole 114 has a diameter of about 2 millimeters. Each dowel pin hole 114 may be closely toleranced relative to the tapped hole 108, such that each dowel pin hole 114 is positioned a distance 116 from the corresponding tapped hole 108. Illustratively, the distance 116 may be embodied as five millimeters. As described above, the dowel pin holes 114 and the tapped holes 108 are positioned in a linear arrangement on the surface 104. For example, as shown in FIG. 1, the dowel pin holes 114 and the tapped holes 108 may be positioned along a gridline of the grid 110. Additionally or alternatively, in some embodiments the dowel pin holes 114 and the tapped holes 108 may be positioned at a 45 degree angle relative to the grid 110, or at another angle. Additionally or alternatively, although illustrated as including a pair of dowel pin holes 114 for each tapped hole 108, it should be understood that in other embodiments the surface 104 may include any periodic pattern of dowel pin holes 114 and tapped holes 108 that may be used for precision positioning of optical blocks.

Figure 2:
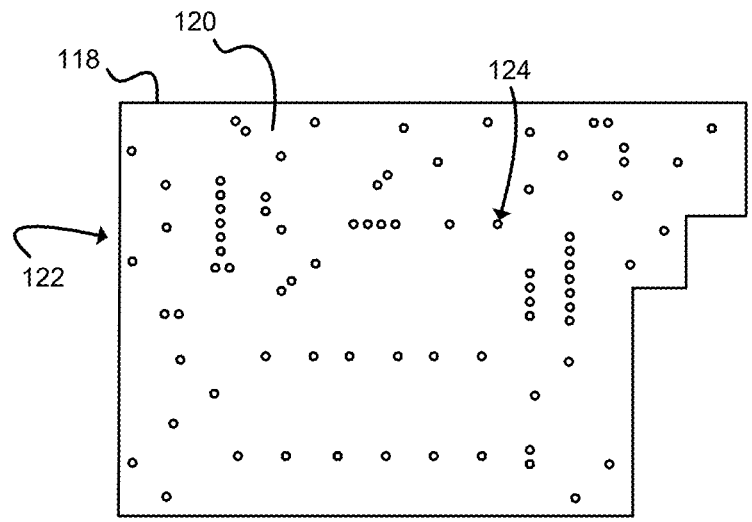
FIG. 2 is a top view of an optical block that may be used with the optomechanical system of FIG. 1.
Figure 3:
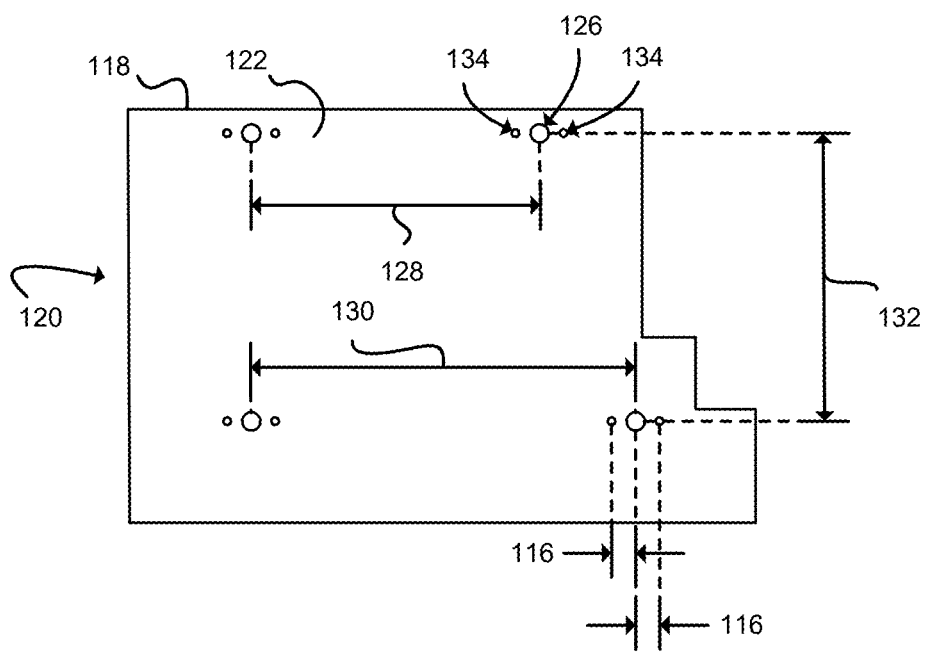
FIG. 3 is a bottom view of the optical block of FIG. 2.

Referring now to FIGS. 2-3, the system 100 further includes an optical block 118, which is illustratively formed from cast aluminum. The optical block 118 includes a top surface 120 and a bottom surface 122. As shown in FIG. 2, multiple dowel pin holes 124 are defined in the top surface 120. Each of the dowel pin holes 124 may be embodied as a smooth-walled hole that is sized to receive a dowel pin, such as a two millimeter dowel pin. As described further below, the dowel pin holes 124 may be used to attach multiple optical elements to the optical block 118. Accordingly, the dowel pin holes 124 are arranged on the top surface 120 in a predetermined arrangement that is based on a desired layout of optical elements for the optical block 118. In some embodiments, the optical elements and associated dowel pin holes 124 may be laid out using a computer aided design (CAD) tool, and the dowel pin holes 124 may be machined in the top surface 120 based on CAD information derived from the CAD tool.

As shown in FIG. 3, multiple tapped holes 126 are defined in the bottom surface 122. Each of the tapped holes 126 has the same size or is otherwise compatible with the tapped holes 108 defined in the top surface 104 of the module plate 102. Similar to the tapped holes 108, the tapped holes 126 are arranged on the bottom surface 122 of the optical block 118 according to the imaginary grid 110 defined by the distance 112. That is, each tapped hole 126 is positioned on an intersection of two imaginary gridlines of the imaginary grid 110. For example, in the illustrative optical block 118 shown in FIG. 3, the tapped holes 126 are separated by horizontal distances 128, 130, and by the vertical distance 132. Because the tapped holes 126 are positioned on the imaginary grid 110, each of the distances 128, 130, 132 between the tapped holes 126 is a multiple of the distance 112. Although illustrated as being positioned on the imaginary grid 110, it should be understood that in other embodiments, the tapped holes 126 may be positioned according to the periodic pattern of tapped holes 108 defined in the top surface 104 of the module plate 102.

Also similar to the module plate 102, each of the tapped holes 126 defined in the bottom surface 122 is surrounded by a pair of dowel pin holes 134 in a linear arrangement, with each dowel pin hole 134 separated from the tapped hole 126 by the distance 116. Accordingly, when the bottom surface 122 of the optical block 118 is positioned on the top surface 104 of the module plate 102, each of the tapped holes 126 is aligned with a corresponding tapped hole 108, and each of the dowel pin holes 134 is aligned with a corresponding dowel pin hole 114. Thus, the optical block 118 may be attached to the module plate 102 using dowel pins positioned in corresponding dowel pin holes 114, 134 and/or with screws or other fasteners positioned in corresponding tapped holes 108, 126. Although illustrated as including a pair of dowel pin holes 134 for each tapped hole 126, it should be understood that in other embodiments, the bottom surface 122 may include any number and/or arrangement of multiple dowel pin holes 134 that each correspond to a dowel pin hole 114 of the module plate 102. For example, in some embodiments, the bottom surface 122 of the optical block 118 may include two dowel pin holes 134 that correspond to dowel pin holes 114 of the module block 102 and are used to precision-align the optical block 118 relative to the module plate 102.

In use, the module plate 102, the optical block 118, and other optical blocks may be assembled into an optomechanical system 100 to perform one or more optical functions. As an illustrative embodiment, the system 100 may be a continuous wave (CW) laser system for an ion trap system. As described above, a desired layout of optical elements for the optomechanical system 100 may be predetermined using a CAD tool. The optical elements may be organized into corresponding optical blocks (including the optical block 118), and corresponding dowel pin holes 124 may be arranged on the optical blocks. After determining the layout of the system 100, the CAD information (e.g., one or more CAD files) may be used to manufacture the optical block 118, for example by machining the shape of the block 118 and/or machining the dowel pin holes 124 on the top surface 120 of the optical block 118. After manufacturing, the optical block 118 may appear as shown in FIGS. 2-3.

Figure 4:
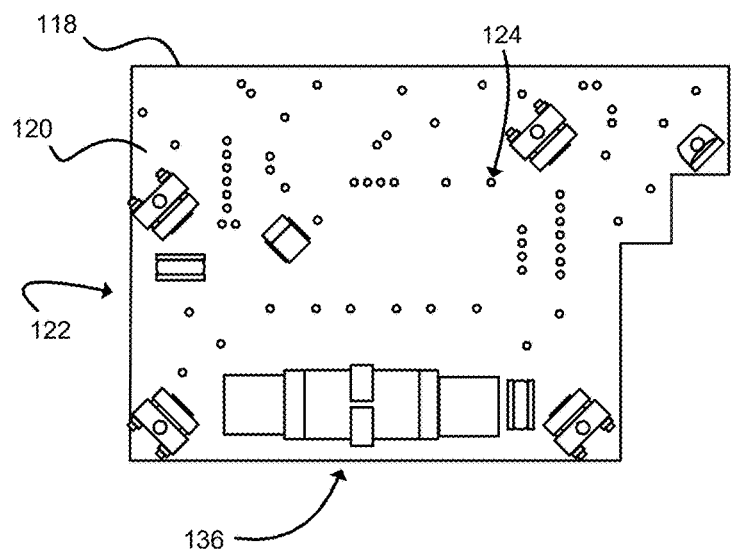
FIG. 4 is a top view of the optical block of FIGS. 2 and 3 assembled with multiple optical elements.

After manufacturing the optical block 118, as shown in FIG. 4, one or more optical elements 136 are attached to the top surface 120 using the dowel pin holes 124. The optical elements 136 may include one or more lasers or other light sources, mirrors or other reflectors, lenses or other refractors, collimators, filters, optical isolators, acousto-optic modulators, electro-optic modulators, fiber optic cables, or other optical elements that may be used as components of an optical system. In particular, each optical element 136 may be attached to the optical block 118 by inserting one or more dowel pin into the optical element 136 and into corresponding dowel pin holes 124 of the optical block 118. Thus, the optical elements 136 may be aligned precisely with respect to each other and the optical block 118. Additionally, each optical element 136 may be easily removed and replaced, providing experimental flexibility needed to re-design and improve optical functions.

Figure 5:
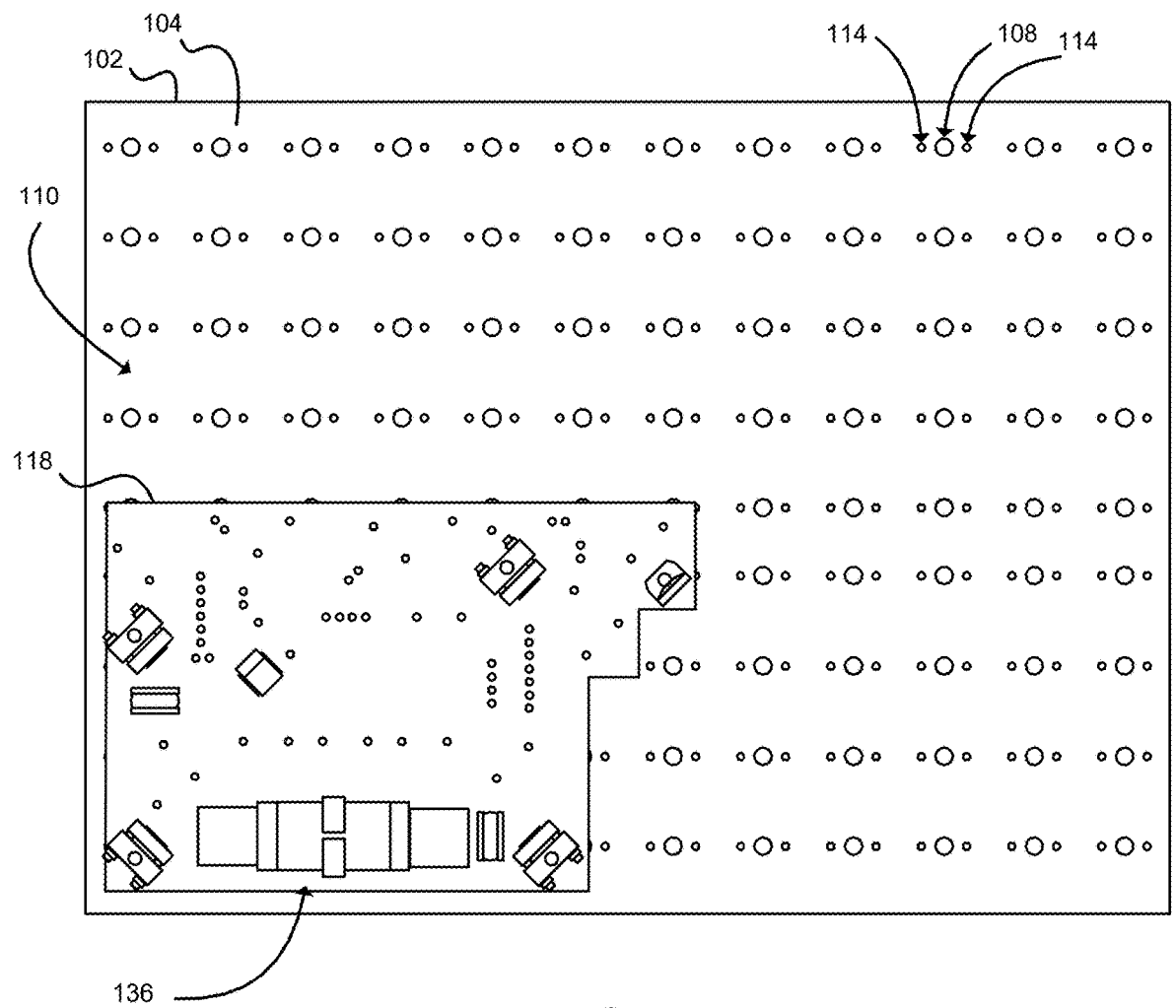
FIG. 5 is a top view of the assembly of FIG. 4 assembled with the module plate of FIG. 1.

After assembling the optical block 118 with the optical elements 136, as shown in FIG. 5, the optical block 118 is attached to the module plate 102. The optical block 118 may be attached to the module plate 102 by inserting two or more dowel pins into the dowel pin holes 134 on the bottom surface 122 of the optical block 118 and then inserting those dowel pins into corresponding dowel pin holes 114 of the module plate 102. Attaching the optical block 118 to the module plate 102 using dowel pin attachment provides for precision positioning of the optical block 118 relative to the module plate 102. Additionally, as the optical block 118 and the module plate 102 are in the illustrative embodiment machined from MIC-6 aluminum, good flat-to-flat interfaces between the optical block 118 and the module plate 102 may be ensured. In some embodiments, the optical block 118 may be secured to the module plate 102 by inserting one or more screws or other fasteners through corresponding tapped holes 108, 126 of the module plate 102 and the optical block 118, respectively. Thus, the optical elements 136 of the optical block 118 are precision aligned with dowel pins and registered to the module plate 102.

Although illustrated as including tapped holes 108, 126, in other embodiments the optical block 118 and the module plate 102 of the system 100 may be secured together using a different mechanical arrangement. For example, in some embodiments the module plate 102 may include a grid 110 of counterbored through holes that are configured to receive bolts that thread into the tapped holes 126 of the optical block 118, securing the optical block 118 to the module plate 102. As another example, each optical block 118 may include one or more through holes that are configured to receive bolts that tread into the tapped holes 108 of the module plate 102. Additionally or alternatively, in some embodiments the optical block 118 may be suspended above the module plate 102, for example with stainless steel posts, to position optical elements 136 at a different height.

Figure 6:
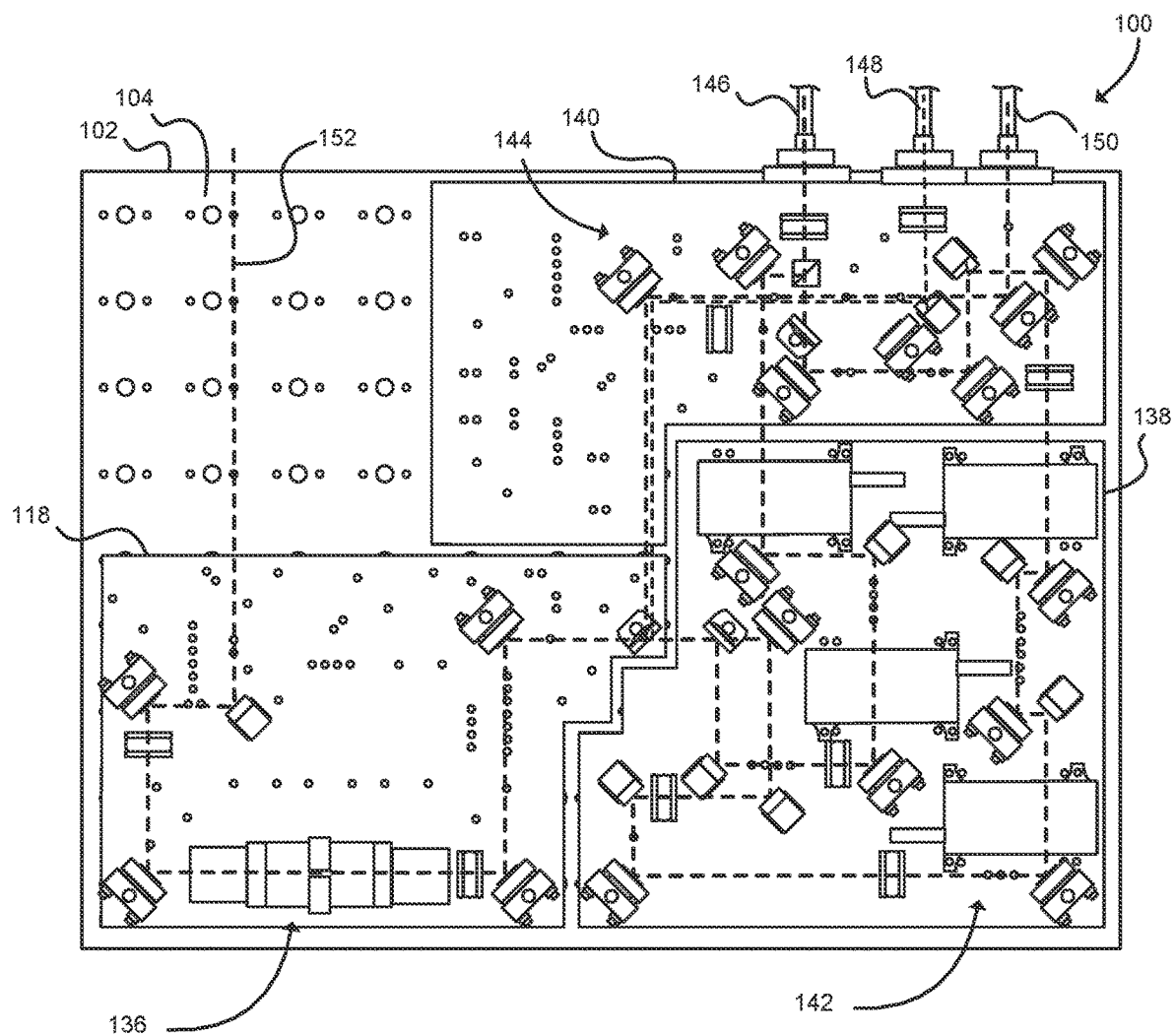
FIG. 6 is a top view of the assembly of FIG. 5 assembled with additional optical blocks with additional optical elements.

After attaching the optical block 118 to the module plate 102, additional optical blocks may be attached to the module plate 102 to complete the optomechanical system 100. An illustrative system 100 is shown in FIG. 6. As shown, additional optical blocks 138, 140 are attached to the module plate 102. Similar to the optical block 118, each optical block 138, 140 includes dowel pin holes 124 arranged on the surface 120. Additional optical elements 142, 144 are attached to the optical blocks 138, 140, respectively, using dowel pins positioned in the corresponding dowel pin holes 124. Illustratively, the optical blocks 118, 138, 140 operate a continuous wave (CW) laser system, which may be an optical module in a larger system. The assembled system 100 includes fiber optics links 146, 148, 150. As shown, a laser beam 152 is input to the system 100, and the laser beam optically interacts with the optical elements 136, 142, 144. As shown, the optical elements 136, 142, 144 are optically coupled in free space (e.g., air or vacuum). The system 100 may include or otherwise be surrounded with a cover (e.g., a metallic cover) to protect the optics from thermal interference, air currents, and other interference. The laser beam 152 illustratively exits the system 100 via the fiber optic links 146, 148, 150. Those fiber optic links 146, 148, 150 may be used to couple the system 100 with other, similar optical modules into a larger optical system.

Referring now to FIGS. 7-13, another illustrative optomechanical system 200 includes an intermediate plate that may be coupled to one or more optical blocks. The intermediate plate and a cryostat are coupled to a base plate. Multiple optical elements are coupled to each of the optical blocks. The optical elements may interact in free space and also may interact with one or more optical elements or other devices (e.g., an ion trap) positioned within a cold chamber of the cryostat. Similar to the system 100, the system 200 provides stable constructions for sensitive optical experiments and other optical systems. In particular, the system 200 remains stable even when subject to mechanical vibrations generated by the cryostat.

Figure 7:
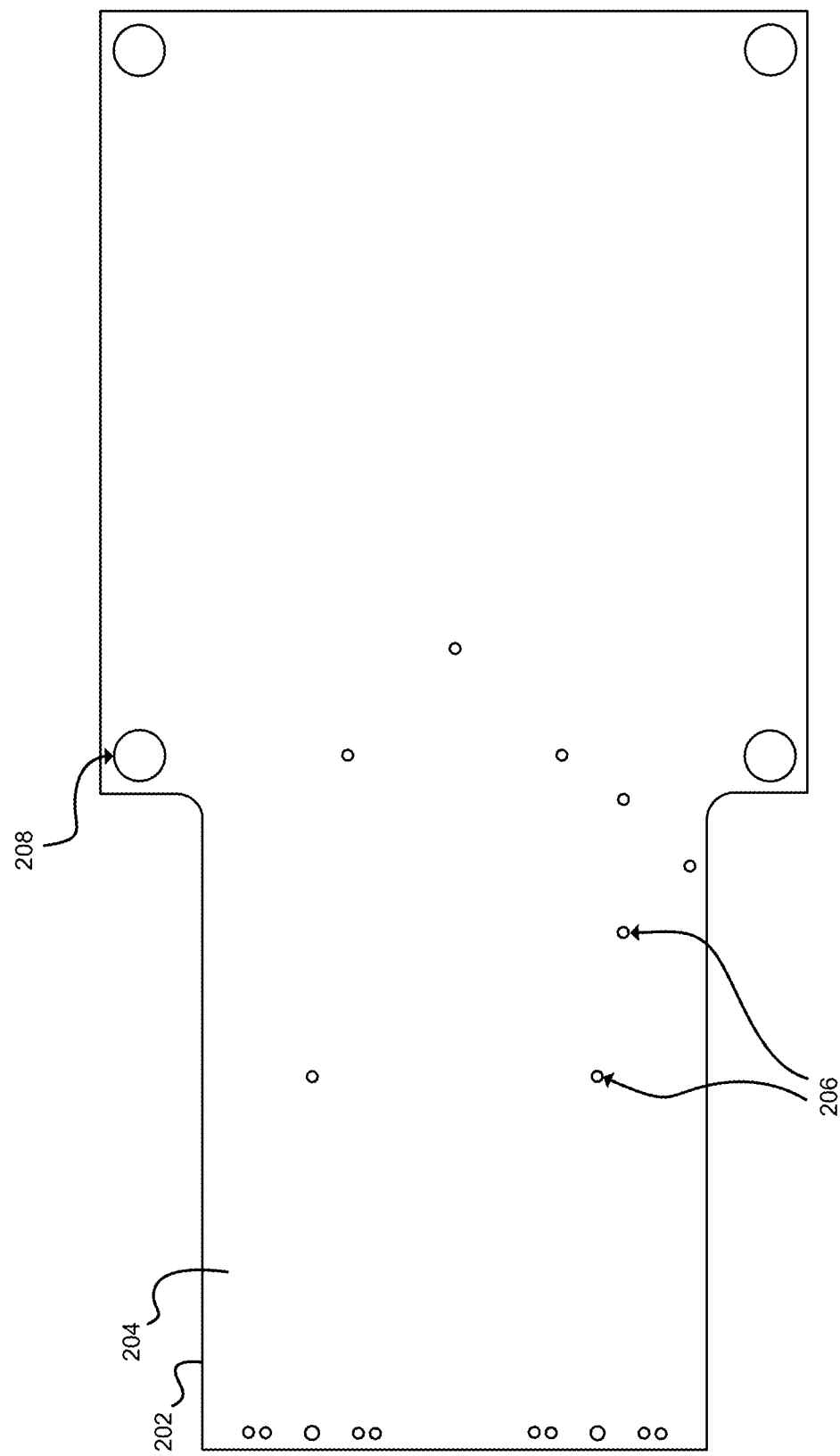
FIG. 7 is a top view of a base plate for another optomechanical system.

Referring now to FIG. 7, the system includes a base plate 202, which is illustratively formed from cast aluminum, and may be attached to an optical table or other support structure (not shown). The base plate 202 includes a top surface 204. Multiple dowel pin holes 206 are defined in the top surface 204. The dowel pin holes may be used to attach a cryostat or other elements to the top surface, as described further below. The top surface 204 also include multiple post holes 208 defined therethrough. The post holes 208 may be used to receive stainless steel mounting posts, as described further below. In some embodiments, the base plate 202 may be attached to a water cooling system or other external cooling system (not shown).

Figure 8:
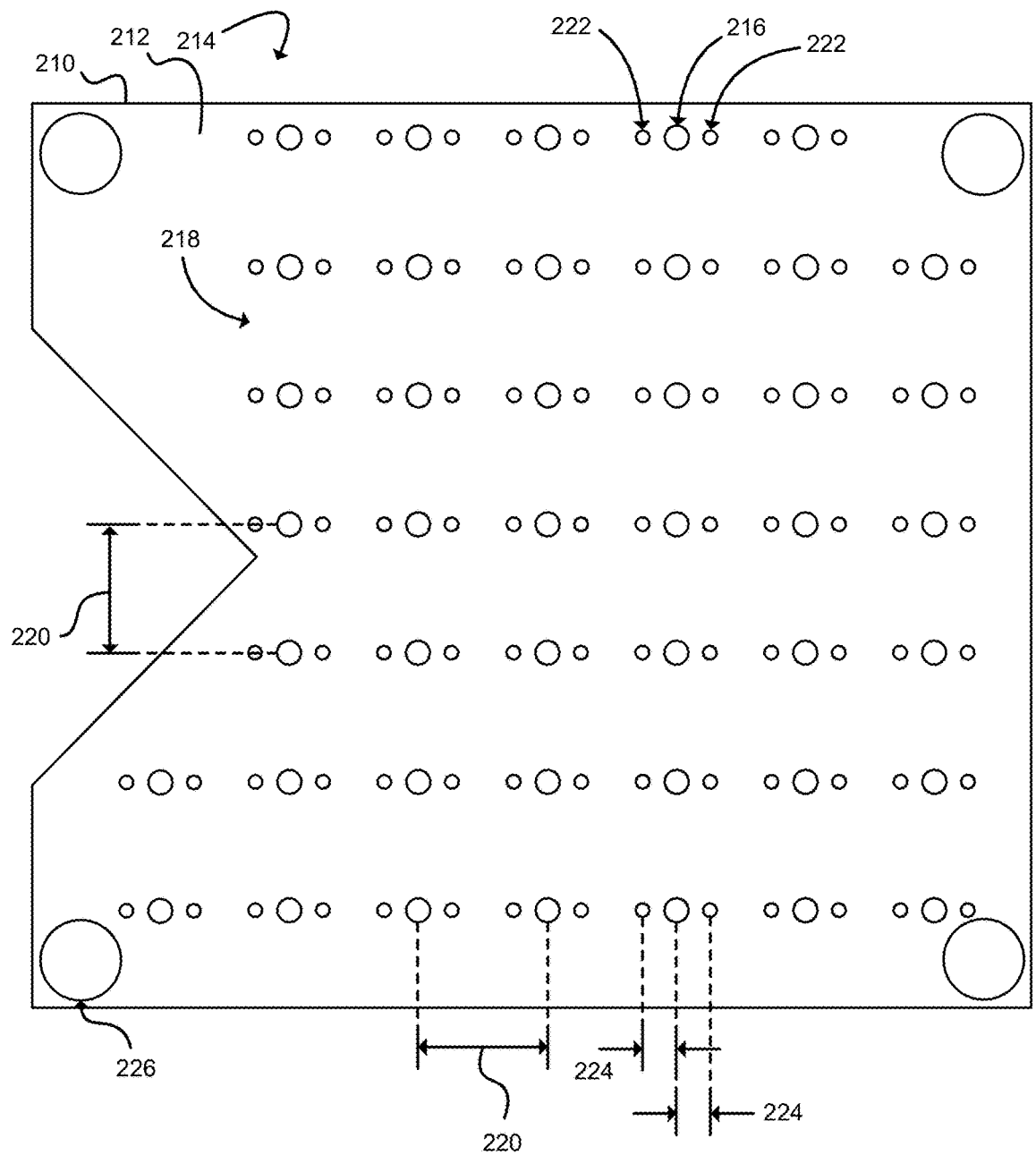
FIG. 8 is a top view of an intermediate plate that may be used with the optomechanical system of FIG. 7.

Referring now to FIG. 8, the system 200 also includes an intermediate plate 210, also called a module plate 210, which is also illustratively formed from cast aluminum. The intermediate plate 210 includes a top surface 212 and a bottom surface 214. Multiple tapped holes 216 are defined in the top surface 212. Each tapped hole 216 may be embodied as a hole that is threaded to receive a predetermined fastener, such as a ¼-UNC 20 tapped hole, an 8-32 UNC tapped hole, or other tapped hole. Similar to the tapped holes 108 of the module plate 102 shown in FIGS. 1-6, the tapped holes 216 are arranged on the top surface 212 in a regular grid 218 having a pitch defined by a distance 220. That is, an imaginary grid 218 is formed from gridlines that are separated by the distance 220 in both the horizontal and the vertical directions. Each tapped hole 216 is positioned at an intersection of two of those imaginary gridlines. Accordingly, each tapped hole 216 is separated on-center from its neighboring tapped holes 216 by the distance 220. The distance 220 may be two inches, one inch, or another predetermined distance.

Each of the tapped holes 216 is surrounded by a pair of dowel pin holes 222, which are positioned in a linear arrangement with the tapped hole 216. Each dowel pin hole 222 may be embodied as a smooth-walled hole that is sized to receive a dowel pin as described further below. Illustratively, each dowel pin hole 222 has a diameter of 2 millimeters, with precision tolerances. Each dowel pin is positioned a distance 224 from the corresponding tapped hole 216. Illustratively, the distance 224 may be embodied as five millimeters. As described above, the dowel pin holes 222 and the tapped holes 216 are positioned in a linear arrangement on the surface 212. For example, as shown in FIG. 8, the dowel pin holes 222 and the tapped holes 216 may be positioned along a gridline of the grid 218. Additionally or alternatively, in some embodiments the dowel pin holes 222 and the tapped holes 216 may be positioned at a 45 degree angle relative to the grid 218, or at another angle. The intermediate plate 210 further includes multiple post holes 226 defined through the surfaces 212, 214. The post holes 226 may be sized similar to the post holes 208 of the base plate 202 and, similarly, may be used to receive stainless steel mounting posts.

Figure 9:
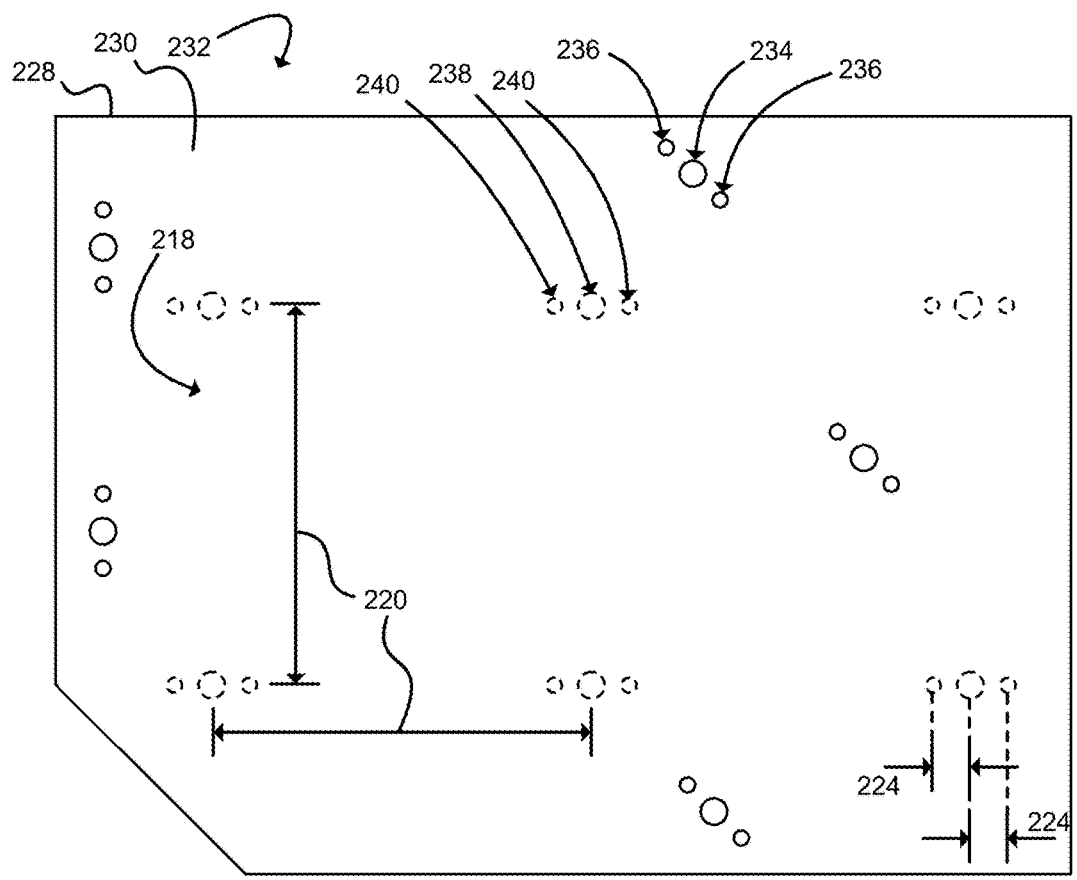
FIG. 9 is a top view of an optical block that may be used with the optomechanical system of FIGS. 7-8.
Figure 10:
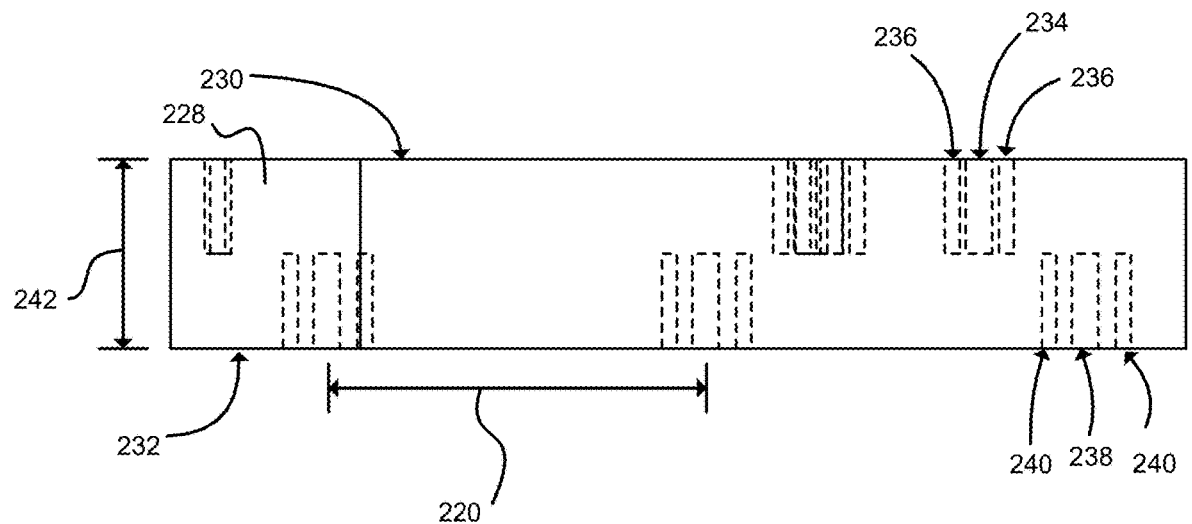
FIG. 10 is a side view of the optical block of FIG. 9.

Referring now to FIGS. 9 and 10, the system 200 further includes an optical block 228, which is illustratively formed from cast aluminum. The optical block 228 includes a top surface 230 and a bottom surface 232. As shown, multiple tapped holes 234 and dowel pin holes 236 are defined in the top surface 230. Each of the tapped holes 234 may be embodied as a hole that is threaded to receive a predetermined fastener, and each of the dowel pin holes 236 may be embodied as a smooth-walled hole that is sized to receive a dowel pin, such as a two millimeter dowel pin. As described further below, the tapped holes 234 and/or the dowel pin holes 236 may be used to attach multiple optical elements to the optical block 228. Accordingly, the tapped holes 234 and the dowel pin holes 236 are arranged on the top surface 230 in a predetermined arrangement that is based on a desired layout of optical elements for the optical block 228. In some embodiments, the optical elements and associated holes 234, 236 may be laid out using a computer aided design (CAD) tool, and the holes 234, 236 may be machined in the top surface 230 based on CAD information derived from the CAD tool.

As shown, multiple tapped holes 238 are further defined in the bottom surface 232. Each of the tapped holes 238 has the same size or is otherwise compatible with the tapped holes 216 defined in the top surface 212 of the intermediate plate 210. Similar to the tapped holes 216, the tapped holes 238 are arranged on the bottom surface 232 of the optical block 228 according to the imaginary grid 218 defined by the distance 220. That is, each tapped hole 238 is positioned on an intersection of two imaginary gridlines of the imaginary grid 218. For example, in the illustrative optical block 228 shown in FIGS. 9 and 10, each of the tapped holes 238 is separated by from its neighboring tapped holes 238 both horizontally and vertically by the distance 220.

Also similar to the intermediate plate 210, each of the tapped holes 238 defined in the bottom surface 232 is surrounded by a pair of dowel pin holes 240 in a linear arrangement, with each dowel pin hole 240 separated from the corresponding tapped hole 238 by the distance 224. Accordingly, when the bottom surface 232 of the optical block 228 is positioned on the top surface 212 of the intermediate plate 210, each of the tapped holes 238 is aligned with a corresponding tapped hole 216, and each of the dowel pin holes 240 is aligned with a corresponding dowel pin hole 222. Thus, the optical block 228 may be attached to the intermediate plate 210 using dowel pins positioned in corresponding dowel pin holes 222, 240 and/or with screws or other fasteners positioned in corresponding tapped holes 216, 238.

As shown in FIG. 10, the optical block 228 has a thickness 242, which is illustratively one inch. Each of the holes 234, 236 defined in the top surface 230 is illustratively embodied as a blind hole with a depth of about one-half of the thickness 242, and, similarly, each of the holes 238, 240 defined in the bottom surface 232 is also illustratively embodied as a blind hole with a depth of about one-half of the thickness 242.

In use, the base plate 202, the intermediate plate 210, the optical block 228, and other optical blocks may be assembled into an optomechanical system 200 to perform one or more optical functions. As an illustrative embodiment, the system 200 may be an optomechanical system for performing optical operations (e.g., laser manipulation, imaging, quantum computing operations, or other operations) with a cryogenically cooled device such as an ion trap. As described above, a desired layout of optical elements for the optomechanical system 200 may be predetermined using a CAD tool. The optical elements may be organized into corresponding optical blocks (such as the optical block 228), and corresponding tapped holes 234 and/or dowel pin holes 236 may be arranged on the optical blocks. After determining the layout of the system 200, the CAD information (e.g., one or more CAD files) may be used to manufacture the optical block 228, for example by machining the shape of the block 228 and/or machining the holes 234, 236 on the top surface 230 of the optical block 228. After manufacturing, the optical block 228 may appear as shown in FIGS. 9 and 10.

Figure 11:
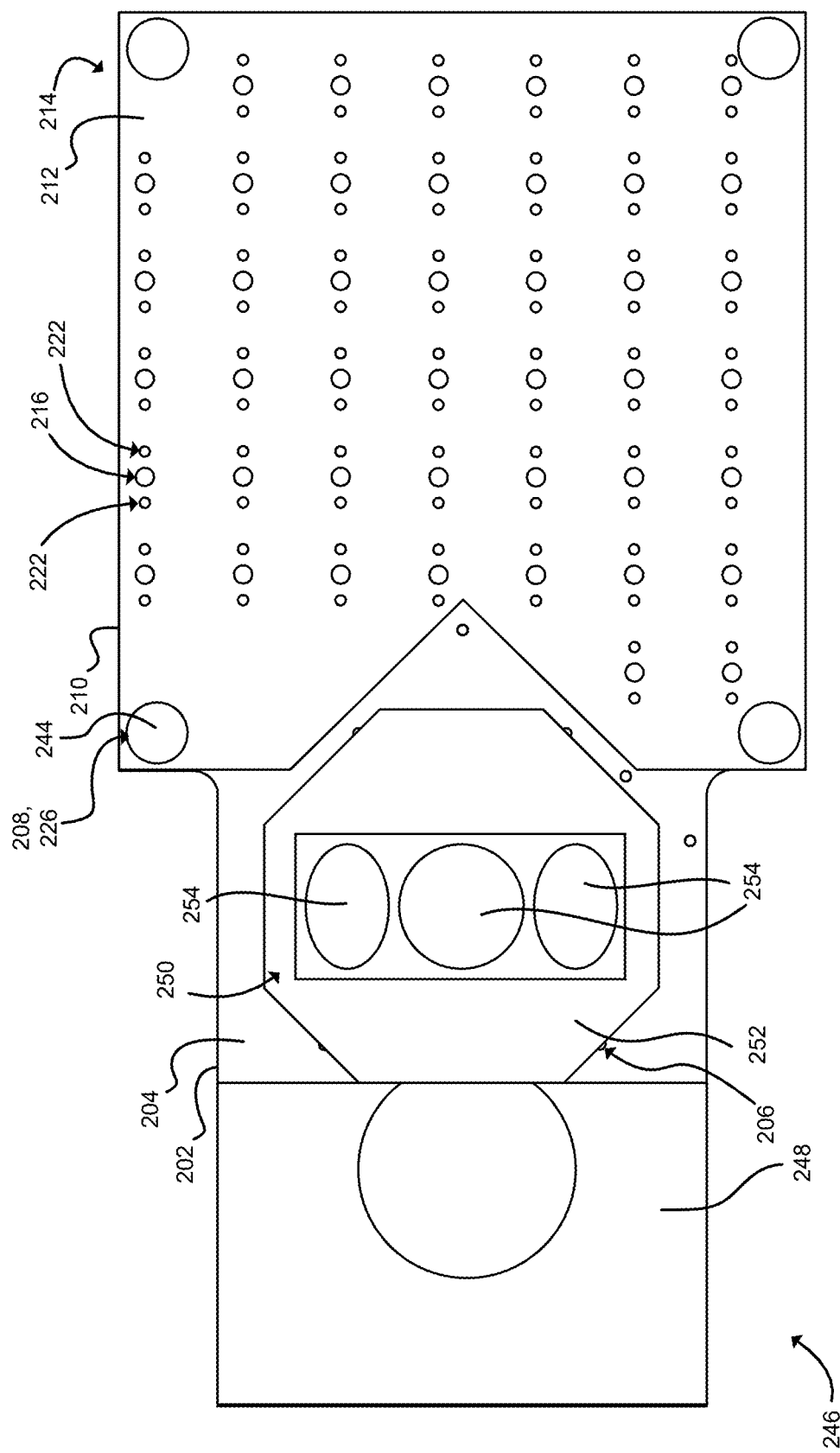
FIG. 11 is a top view of the base plate of FIG. 7 assembled with the intermediate plate of FIG. 8 and a cryostat.

Referring now to FIG. 11, in use, the intermediate plate 210 may be secured to the base plate 202. Illustratively, the intermediate plate 210 is secured to the base plate 202 with four stainless steel posts 244 positioned in the corresponding post holes 208, 226 of the base plate 202 and the intermediate plate 210, respectively. The posts 244 may be secured to the base plate 202 and the intermediate plate 210 using set screws or some other fastener. The posts 244 suspend the intermediate plate 210 above the base plate 202, allowing wiring, optical fibers, and other supporting devices to be routed between the base plate 202 and the intermediate plate 210.

As shown in FIG. 11, a cryostat 246 may be secured to the base plate 202. Illustratively, the cryostat 246 is positioned using one or more dowel pin holes 206 defined in the top surface 204 of the base plate 202; however, in other embodiments any other appropriate technique may be used to attach the cryostat 246 to the base plate 202. The cryostat 246 is illustratively a Montana Instruments Cryostation s200, which is a closed-cycle cryostat incorporating a Gifford-McMahon cryocooler while providing low levels of vibration. In other embodiments, any other appropriate cryostat may be used. The illustratively cryostat 246 includes a cryo cooler 248 coupled to a cryo chamber 250. The cryo chamber 250 has a cover 252 with multiple windows 254 that allow optical access to the interior of the cryo chamber 250. The interior of the cryo chamber 250 may include one or more stages, mounting posts, or other attachment points for cryo devices such as an ion trap, as well as other components such as radiation shields.

Figure 12:
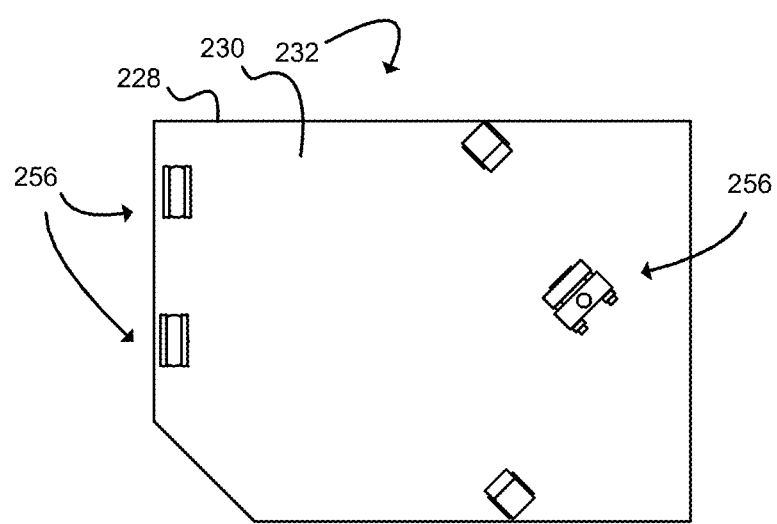
FIG. 12 is a top view of the optical block of FIGS. 9 and 10 assembled with multiple optical elements.

Referring now to FIG. 12, after the optical block 228 is manufactured, one or more optical elements 256 may be attached to the top surface 230 using the tapped holes 234 and/or the dowel pin holes 236. Of course, the optical elements 256 shown in FIG. 12 are illustrative, and in other embodiments the optical block 228 may include a different number, type, and/or arrangement of optical elements 256. As described above, the optical elements 256 may include one or more lasers or other light sources, mirrors or other reflectors, lenses or other refractors, collimators, filters, optical isolators, acousto-optic modulators, electro-optic modulators, fiber optic cables, or other optical elements that may be used as components of an optical system. In particular, each optical element 256 may be attached to the optical block 228 by inserting one or more dowel pin into the optical element 256 and into corresponding dowel pin holes 236 of the optical block 228. The optical element 256 may be secured to the optical block 228 using the tapped holes 234. Thus, the optical elements 256 may be aligned precisely with respect to each other and the optical block 228. Additionally, each optical element 256 may be easily removed and replaced, providing experimental flexibility needed to re-design and improve optical functions.

Figure 13:
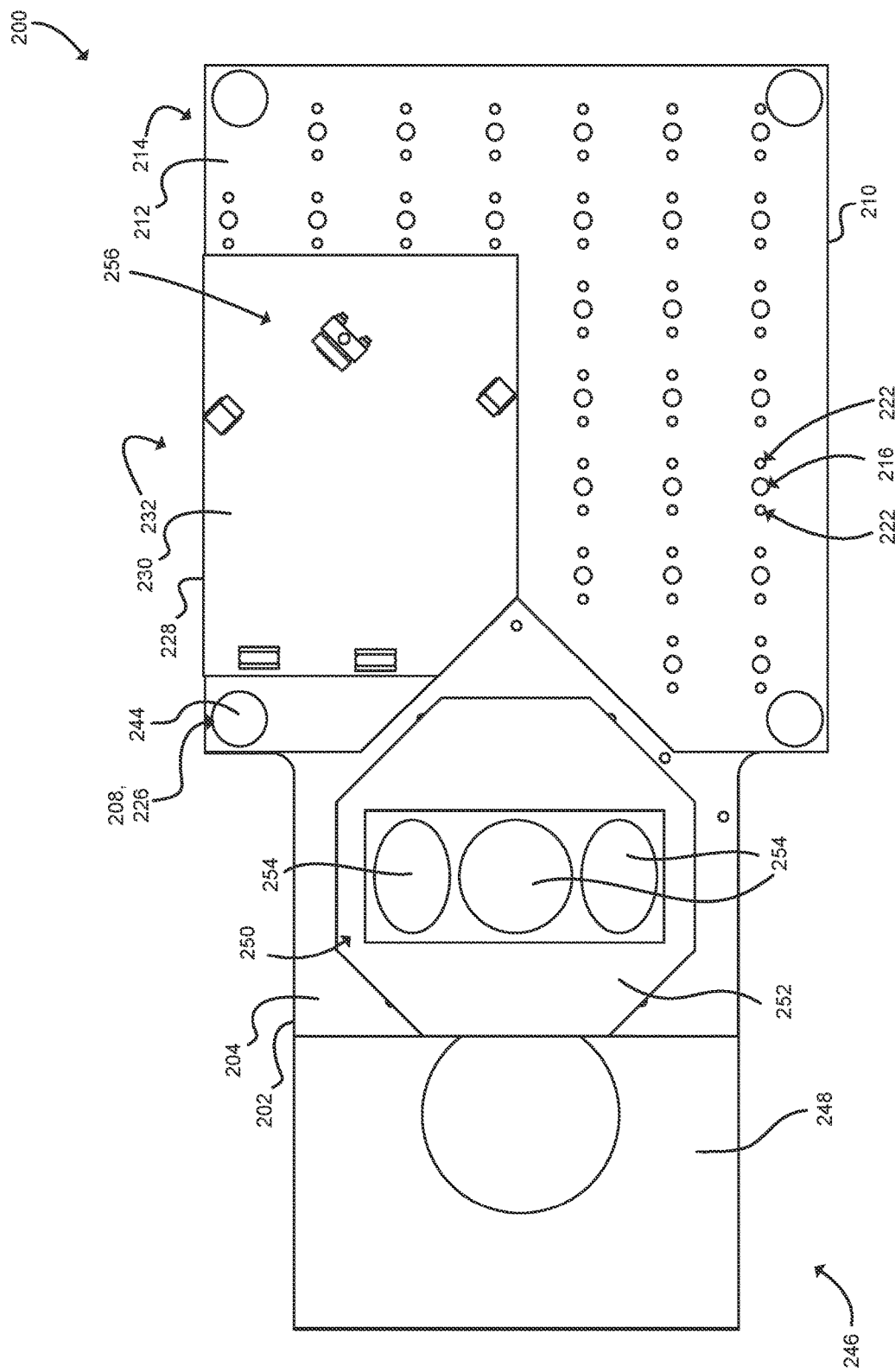
FIG. 13 is a top view of the assembly of FIG. 11 assembled with the assembly of FIG. 12.

Referring now to FIG. 13, after assembling the optical elements 256 with the optical block 228, the assembled optical block 228 may be secured to intermediate plate 210 with dowel pins positioned in corresponding dowel pin holes 222, 240 of the intermediate plate 210 and the optical block 228, respectively. The optical block 228 may be secured to the intermediate 210 using one or more fasteners positioned in the tapped holes 216, 238. The optomechanical system 200 may include additional optical blocks fastened to the intermediate plate 210 (not shown) and configured for optical interaction with the optical block 228, the cryostat 246, and/or other components of the system 200. In some embodiments, in order to introduce vertical height between the intermediate plate 210 and the optical elements 256, one or more optical blocks may be attached to the intermediate plate 210 with multiple posts. Each of the posts may be formed from stainless steel. Each post includes dowel pin holes defined in either end, allowing each post to be precision positioned on the intermediate plate 210 and the optical block to be precision positioned on the posts. Accordingly, the optical blocks attached to the intermediate plate 210 with posts are also precision positioned and registered to the intermediate plate 210.

The system 200 may further include a metallic housing covering part or all of the system 200 (not shown). In use, the optical functions 256 of the optical block 228 may be optically coupled with interior of the cryo chamber 250, for example through one or more of the windows 254. The optical functions 256 may be coupled to other optical modules outside of the system 200 (e.g., outside of the metallic housing) through one or more optical fibers. For example, in an embodiment the optomechanical system 200 may be coupled by optical fiber to a continuous wave laser system similar to the system 100 shown in FIGS. 1-6. Other optical modules and/or optical blocks that may be used with the system 200 may include a laser frequency stabilization module, a 355 nm Raman laser modulation module, an ion imaging and state detection optical block, a CW beam delivery optical block for non-coherent qubit operations such as photo-ionization, Doppler cooling, state initialization and detection, Raman beam delivery for quantum gates, and ablation loading for the ion source. Each of those optical blocks may be designed and installed on an optical block that is incorporated into the system 200, similar to the optical block 228, or in some embodiments laser light between those modules may be routed using optical fibers.

The cryostat 246 is configured to chill the interior of the cryo chamber 250 to cryogenic temperatures, such as 90 K, 5 K, or another desired cryogenic temperature. In use, the cryo chamber 250 is configured to have one or more cryo devices included inside, such as ion trap devices for quantum computing applications. Although illustrated as including a cryostat 246, it should be understood that in other embodiments the system 200 may include any other functional block, biological sample, test subject, or other object to which optics from the system 200 are to be aligned.

In an illustrative embodiment, the cryo chamber 250 includes a stage for placing components that are cooled to a relatively high cryogenic temperature, such as 90 K. The 90 K stage include a sample mount extending upward that cools to a lower cryogenic temperature, for example 5 K, or as another example below 10 K. The sample mount may include tapped holes or other facilities for attaching a cryo-package or other cryo device.

In some embodiments, the cryo chamber 250 may have O-ring sealing or other sealing to allow a vacuum to be maintained within the cryo chamber 250. In those embodiments, the cryo chamber 250 may not achieve ultra-high vacuum (UHV) levels. For example, the cryo chamber 250 may achieve vacuum at a pressure of about $10^{-8}$ Torr. In those embodiments, the cryo chamber 250 may include a secondary vacuum chamber to achieve UHV levels (e.g., about $10^{-10}$ Torr). One such embodiment of a cryo-package assembly capable of maintaining UHV using differential pumping is described below in connection with FIGS. 14-16.

In several experiments, an optomechanical system similar to the optomechanical systems 100, 200 was tested for mechanical and thermal stability. In one experiment, an interferometer was used to measure relative vibration in the system while operating the cryostat by mounting a mirror in place of the cryo-package assembly on the sample mount. In that experiment, displacement due to mechanical vibration while operating the cryostat was measured at approximately 17 nm peak-to-peak with an RMS deviation of 2.4 nm. This displacement is small compared to the optical wavelength of the Raman beam (355 nm) and thus should provide stable beams at the ion location to drive high fidelity quantum gates. In another experiment, optical coherence of counter-propagating Raman beams delivered by the one or more optical blocks was estimated by measuring the interferometric stability of the Raman beams at the ion location. In that experiment, optical coherence time was estimated as 330 ms, which is not expected to be a limiting factor for entangling gate fidelity.

Figure 14:
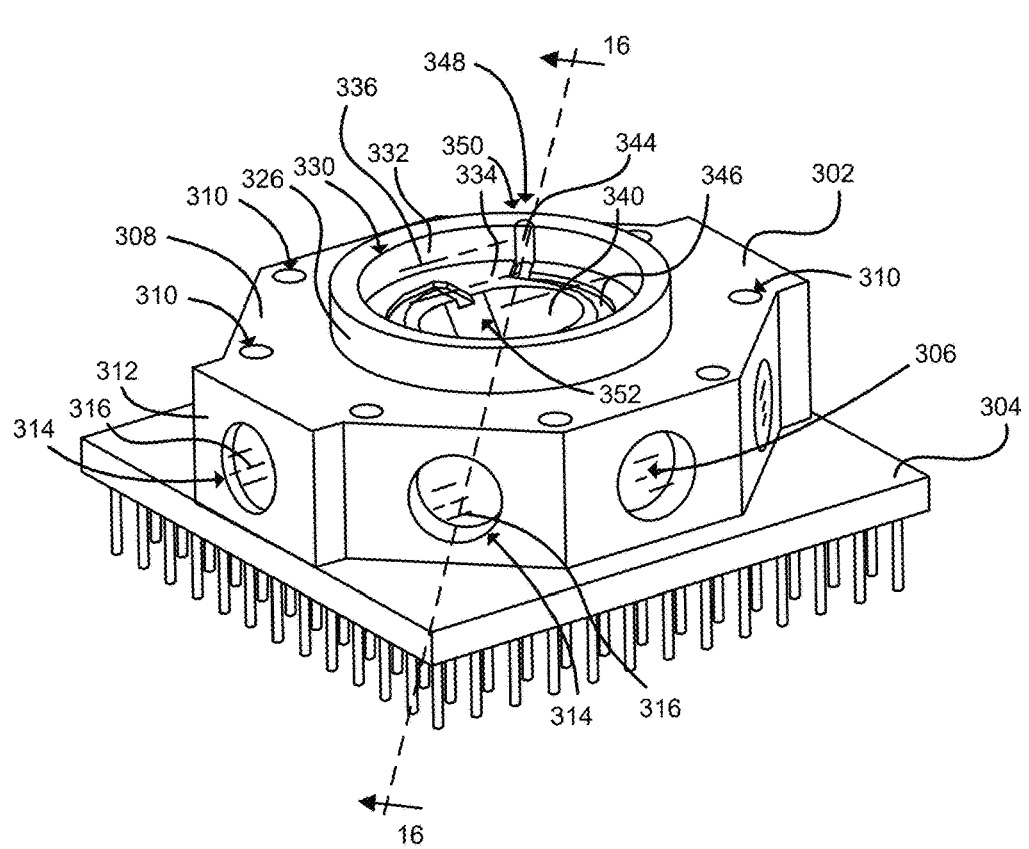
FIG. 14 is a view of a cryo-package assembly including an ion trap device that may be used with the optomechanical system of FIGS. 7-13.
Figure 15:
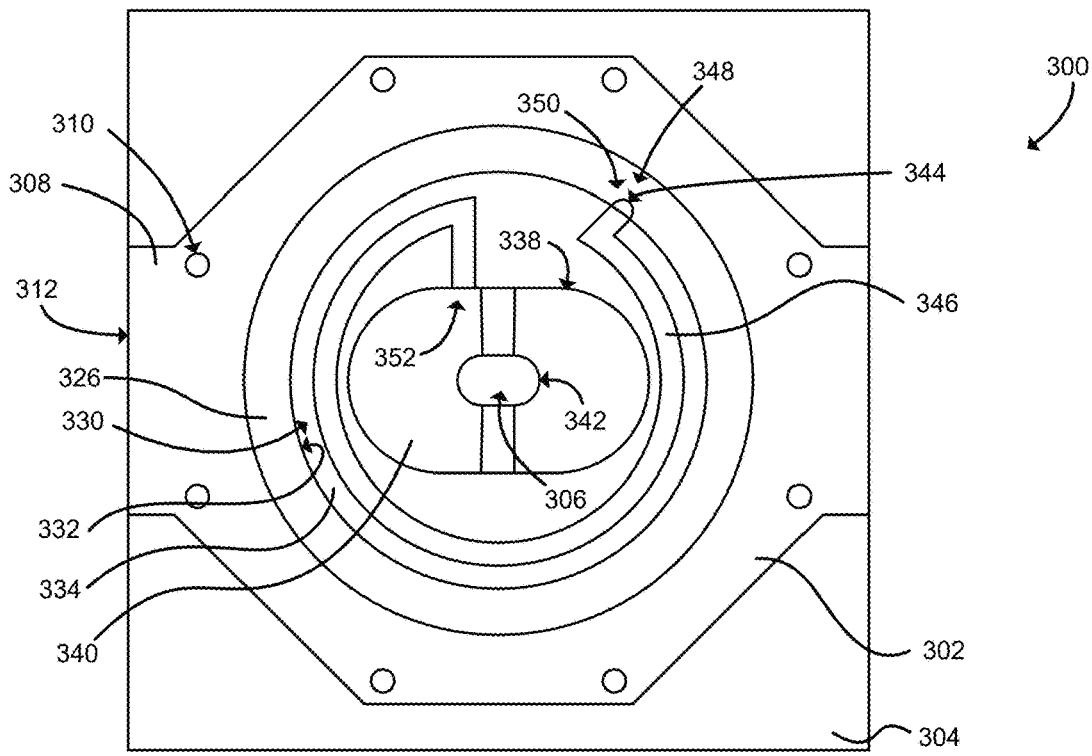
FIG. 15 is a top view of the cryo-package assembly of FIG. 14.
Figure 16:
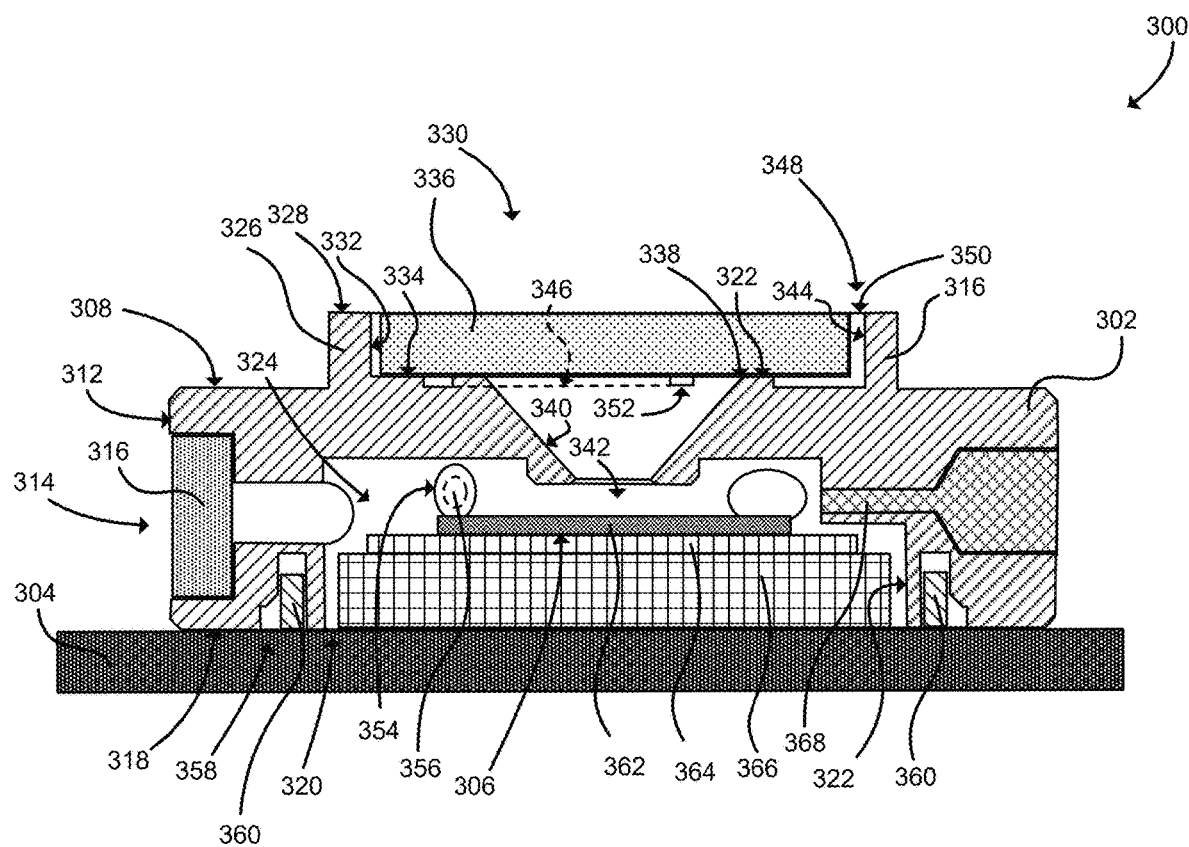
FIG. 16 is a cross-sectional view of the cryo-package assembly of FIGS. 14 and 15.

Referring now to FIGS. 14-16, a cryo-package assembly 300 is shown that may be used with the optomechanical systems 100, 200 of FIGS. 1-13. In particular, the illustrative cryo-package assembly 300 may be mounted within the cryo-chamber 250 of the cryostat 246 coupled to the optomechanical system 200 of FIGS. 7-13. Of course, in other embodiments the cryo-package assembly 300 may be used with other cryostats or cryogenic optical equipment.

The illustrative cryo-package assembly 300 includes a machined copper lid 302 coupled to a package 304. Although the illustrative embodiment includes a copper lid 302, in other embodiments the lid may be formed from another metallic material. A cryo device 306 such as an ion trap is positioned on the package 304, underneath the lid 302. In use, the lid 302 includes a nonlinear, meandering differential pumping passageway, which allows the interior of the lid 302 to reach ultra-high vacuum (UHV) levels at cryogenic temperatures. The cryo-package assembly 300 provides a compact UHV assembly that minimizes the volume of the UHV environment to be maintained while containing components necessary for ion trapping or other cryo devices.

The illustrative package 304 is a 100-pin ceramic pin grid array (CPGA) package. The package 304 is configured to support the cryo device 306 and provide wires, pins, or other components for interfacing external devices with the cryo device 306. In use, the package 304 may be coupled to a printed circuit board (PCB) or other circuitry as described further below.

The lid 302 includes a top surface 308. Multiple tapped mounting holes 310 are defined in the top surface 308. A side wall 312 extends downward from the top surface 308 toward the package 304. Illustratively, the side wall 312 has a roughly octagonal, faceted shape; however, in other embodiments the side wall 312 may have a different number and/or arrangement of facets or may have a different shape. Multiple side window openings 314 are defined through the side wall 312. A side window 316 is fixed into each of the side window openings. Illustratively, each side window 316 is formed from N-BK7 glass with an anti-reflective coating and is attached to the lid 302 using a cryogenic-compatible epoxy such as Epotek T7110.

As best shown in FIG. 16, the lid 302 further includes a bottom surface 318 extending inward from the side wall 312 and parallel to the surface of the package 304. An opening 320 is defined in the bottom surface 318, and an inner wall 322 extends inward from the opening 320 back toward the top surface 308. The inner wall 322 defines an interior cavity 324 of the lid 302. As shown, the cryo device 306 may be positioned within the interior cavity 324.

Referring again to FIG. 14-16, the lid 302 further includes an imaging window surround 326 that extends upward from the top surface 308 to a top ring 328. The top ring 328 of the imaging window surround 326 has an annular shape that defines an imaging window opening 330. An inner wall 332 extends inwardly from the imaging window opening 330 to a bottom surface 334 of the imaging window opening 330. The bottom surface 334 may be positioned above, below, or at the same level as the top surface 308 of the lid 302. A circular imaging window 336 is positioned in the imaging window opening 330. The imaging window 336 is illustratively formed from sapphire with an anti-reflective coating and is attached to the lid 302 using a cryogenic-compatible epoxy such as Epotek T7110.

An oblong opening 338 is defined in the bottom surface 334 of the imaging window opening 330. A ground shield wall 340 extends inwardly from the opening 338 to an aperture 342. As best shown in FIG. 16, the aperture 342 is in communication with the interior cavity 324 of the lid 302. The ground shield wall 340 has an oblong, conical shape such that the aperture 342 is narrower than the opening 338. The ground shield wall 340 is shaped to allow the full numerical aperture of the imaging optics to be available (i.e., to the cryo device 306 in the interior cavity 324 through the aperture 342) while maximally shielding the cryo device 306 from any potential impact of charge buildup at the exposed dielectric window 336.

An evacuation groove 344 is defined in the inner wall 332 of the imaging window surround 326. As shown, the groove 344 extends from the top ring 328 of the imaging window surround 326 to the bottom surface 334 of the imaging window opening 330. The groove 344 is further in communication with a curved evacuation groove 346 defined in the bottom surface 334 of the imaging window opening 330. The groove 346 follows a nonlinear path from the groove 344 to the opening 338, where the ground shield wall 340 meets the bottom surface 334 of the imaging window opening 330. Each of the grooves 344, 346 may have a flat bottom, a curved bottom, an angled bottom, or any other profile.

When the imaging window 336 is positioned in the imaging window opening 330, the imaging window 336 and the grooves 344, 346 cooperate to define a meandering passageway 348, which extends from an end 350 positioned at the top ring 328 of the imaging window surround 326 to an end 352 positioned at the opening 338 where the ground shield wall 340 meets bottom surface 334. Accordingly, the meandering passageway 348 provides a nonlinear pathway for gases, molecules, or other substances to travel between the interior cavity 324 and the exterior of the lid 302. As described further below, the walls of the meandering passageway 348 (e.g., the grooves 344, 346 and/or the imaging window 336) are capable of remaining cold and thus functioning as a cryopumping surface. Although illustrated as being defined by the imaging window 336 and the grooves 344, 346, it should be understood that in other embodiments the meandering passageway 348 may be defined by the lid 302 alone or in combination with other components of the cryo-package assembly 300 (e.g., one or more side windows 316 or other components).

As shown in FIG. 16, the inner wall 322 of the lid 302 defines a getter cavity 354 that is in communication with the interior cavity 324. In use, a charcoal getter 356 may be positioned in the getter cavity 354. The charcoal getter 356 may be embodied as, for example, activated charcoal contained in a copper mesh. As described further below, the getter 356 may absorb molecules to perform cryopumping and further reduce pressure within the interior cavity 324.

As also shown in FIG. 16, the bottom surface 318 further defines a ringframe groove 358 that surrounds the opening 320. The ringframe groove 358 is sized to receive a ringframe 360, which is illustratively a metallic ring brazed to the package 304. The ringframe 360 is illustratively 1 mm wide and extends 2.5 mm above the surface of the package 304.

The illustratively cryo device 306 is an ion trap 362, which is a device configured to capture ions, for example for quantum computing purposes. For example, the ion trap 362 may be embodied as a microfabricated surface ion trap based on the high optical access trap (HOA-2) developed at Sandia National Laboratories. As shown in FIG. 16, the ion trap 362 is mounted on an interposer 364 and a ceramic spacer 366. The interposer 364 and the spacer 366 include vias for coupling the ion trap 362 to the package 304. The interposer 364 and the spacer 366 raise the ion trap 362 above the level of the ringframe 360 and in line with the side windows 316 of the lid 302. The interposer 364 may also include additional electrical components or other circuitry, such as trench capacitors to filter any RF signal on the DC electrodes.

The interior cavity 324 further includes an internal holder for an ablation target 368, which is illustratively a source of ytterbium ions ($Yb^+$) for the ion trap 362. The ablation target 368 has optical access from a window 316 positioned directly across from the ablation target 368. In use, an ablation laser (e.g., a Q-switched Nd:YAG laser) may be directed by one or more optical blocks through the window 316 to the ablation target 368.

In use, the cryo-package assembly 300 may be assembled in a clean room at room temperature. Initially, a cryo device 306 such as the ion trap 362 is coupled to the package 304. A charcoal getter 356 is placed in the getter cavity 354 within the lid 302, and an ablation target 368 is positioned in the internal holder in the lid 302. At this point, other additional items may be positioned inside the internal cavity of the lid 302.

After positioning items within the lid 302, the lid 302 is secured to the package 304. In particular, the lid 302 is positioned on top of the package 304, and the groove 358 defined in the bottom surface 318 of the lid 302 receives the ringframe 360 extending outward from the package 304. The ringframe 360 serves as an alignment mechanism for the lid 302 and as mechanical reinforcement for the mating of the lid 302 and the package 304. Indium wires (not shown) may also be positioned between the ringframe 360 and the lid 302, which provide a breakable mechanical bond between the lid 302 and the package 304. The package 304 may be pressed into a printed circuit board (PCB) or other mechanical or electrical support device.

After assembling the lid 302 and the package 304, the lid 302 is attached to a sample mount (e.g., a cold finger) within the cryo chamber of a cryostat, such as the cryostat 248 discussed above. In particular, the top surface 308 of the lid 302 may be firmly affixed to the sample mount using fasteners in the tapped holes 310. A small amount of thermal grease or other thermal interface material (TIM) may be applied to the interface between the lid 302 and the cryostat. Additional screws may be used to support the PCB or other components for strain relief. The package 304 and/or supporting PCB may be connected to one or more electrical connections (e.g., a DC connection, an RF connection, etc.). Wires and other connections to the cryo-package assembly 300 may be thermally lagged to reduce heat transfer to the cryo-package assembly 300.

After mounting and connecting the cryo-package 304, the cryo chamber 252 is sealed, and then air is pumped out of the cryo chamber 252 at room temperature. At room temperature or other relatively warm temperatures, as the pressure surrounding the assembly 300 lowers, air and gases from the interior cavity 324 of the lid 302 are evacuated from the cryo-package assembly 300 through the meandering passageway 348. Thus, at such relatively warm temperatures, pressure within the interior cavity 324 of the lid 302 is equalized with the cryo chamber 252.

Next, the cryostat 248 is activated, and temperature is lowered within the cryo chamber 252. As the cryo-package assembly 300 reaches cryogenic temperatures (e.g., 90 K, below 10 K, 5 K, etc.) molecules within the interior cavity 324 slow their movements and tend to freeze or otherwise stick to surfaces that they contact. Because the meandering passageway 348 does not include any straight, linear path from outside of the lid 302 to the interior cavity 324, gas molecules are unlikely to pass through the passageway 348 without contacting walls of the lid 302 and/or the window 336. Accordingly, at cryogenic temperatures, molecules tend to freeze within the passageway 348 and tend not to pass from the exterior of the lid 302 to the interior cavity 324.

After reaching cryogenic temperatures, gas molecules within the interior cavity 324 react with the getter 356 and are sorbed to the getter 356. This cryopumping reduces pressure inside the interior cavity 324. Because gas molecules from outside of the lid 302 cannot enter the interior cavity 324 through the meandering passageway 348, the interior cavity 324 can establish a pressure differential with the cryo chamber 252. Using such cryopumping, the interior cavity 324 of cryo-package 300 is capable of achieving a state of the art UHV environment suitable for performing high fidelity quantum computing operations.

In several experiments, an optomechanical system similar to the optomechanical systems 100, 200 including a cryo-package assembly with an ion trap similar to the assembly 300 was tested for mechanical and thermal stability. In particular, in the experimental system, the optical wavefronts of the intersecting Raman beams were stable at the ion location over the duration of entangling gates that utilize the motional degrees of freedom of the ions in the chain. In one experiment, while operating the ion trap including active DC electrical connections and an active RF signal, temperatures of 8.16 degrees K and 8.79 degrees K were measured at the 5K platform and at the sample mount, respectively. In another experiment, pressure achieved within the interior cavity of the cryo-package assembly was estimated by observing zig-zag flip events for an ion trap. A long linear chain of ions can be trapped in a surface trap, but when the axial confinement potential exceeds a threshold, the chain of ions buckles and collapses into a zig-zag shape. There are two energetically degenerate, stable ground states that can arise in such a zig-zag shape, and the number of transitions between those shapes is related to the collision rate of the captured ions and background molecules. Based on that experiment, it was estimated that the interior of the cryo-package assembly achieved about $10^{-12}$ Torr at 8 K, $10^{-11}$ Torr at 10 K, and $10^{-10}$ Torr at 12 K. In another experiment, the motional heating rate of ions in the trap was measured for multiple trap mode frequencies. The mean heating rate for these measurements was 13 quanta/s with a standard deviation of 5.1 quanta/s. This value is significantly improved over ion trap systems and thus should not pose any limitation on achieving high-fidelity entangling gates.

The invention claimed is:

1. A cryo-package assembly comprising:
a package comprising a substrate configured to support a cryo device;
a metallic lid coupled to the package, the lid comprising a top surface, a bottom surface, and a side wall extending between the top surface and the bottom surface, wherein a first opening is defined in the bottom surface and an inner wall extends inwardly from the first opening and defines an interior cavity, wherein when the lid is coupled to the package the cryo device is positioned within the interior cavity; and
an imaging window coupled to the lid;
wherein the lid defines a meandering passageway from a first end to a second end, wherein the first end is in communication with an exterior of the lid, and wherein the second end is in communication with the interior cavity, and wherein the meandering passageway defines a nonlinear path between the first end and the second end;
wherein a second opening is defined in the top surface of the lid, wherein the second opening is in communication with the interior cavity, and wherein the top surface includes a groove extending along a nonlinear path to the second opening;
wherein the imaging window is coupled to the lid and covers the second opening;
wherein the imaging window and the groove cooperate to define the meandering passageway;
wherein the lid further comprises an annular imaging window surround extending upward from the top surface of the lid, wherein the imaging window surround receives the imaging window; and
wherein the imaging window surround includes a second inner wall extending upward from the top surface of the lid, wherein the second inner wall surrounds the second opening, wherein a second groove is defined in the second inner wall of the imaging window surround, wherein the second groove is in communication with the groove defined in the top surface, and wherein the imaging window and the second groove further define the meandering passageway.

2. The cryo-package assembly of claim 1, wherein the inner wall further defines a getter cavity in communication with the interior cavity, wherein the getter cavity is configured to receive a charcoal getter device, the charcoal getter device comprising activated charcoal packaged in a copper mesh.

3. The cryo-package assembly of claim 1, further comprising a ring frame coupled to the package, wherein the ring frame surrounds the cryo device, wherein the bottom surface of the lid defines a ring frame groove, and wherein when the lid is coupled to the package the ring frame groove receives the ring frame.

4. The cryo-package assembly of claim 1, wherein the cryo device comprises an ion trap device.

5. The cryo-package assembly of claim 1, wherein the lid further comprises a ground shield wall extending inwardly from the second opening to an inner end, wherein the inner end defines an aperture in communication with the interior cavity, and wherein the aperture is narrower than the second opening.

6. The cryo-package assembly of claim 1, wherein a plurality of tapped holes are defined in the top surface of the lid.

7. The cryo-package assembly of claim 1, wherein a side window opening is defined through the side wall, the cryo-package assembly further comprising a side window coupled to the lid in the side window opening and an ablation target positioned within the interior cavity, wherein the ablation target has a line of sight to the side window.

* * * * *